United States Patent Office
3,378,848
Patented Apr. 16, 1968

3,378,848
ANGLE MEASURING EQUIPMENT
John Thomas Baylor, San Diego, Calif., assignor to Cubic Corporation, San Diego, Calif., a corporation of California
Filed Sept. 12, 1966, Ser. No. 578,796
7 Claims. (Cl. 343—113)

ABSTRACT OF THE DISCLOSURE

An improved angle measuring equipment that detects the difference in phase between at least two radio frequency signals developed by at least two separate antenna units positioned along a known base line by reception from a single signal source.

Background of the invention

When a single signal source radiates energy, the phase of the received signal at one receiving point with respect to the phase of the signal at another receiving point will vary as a function of the direction of the signal source relative to a base line located along the two receiving points. Accordingly, by accurately measuring and comparing the phase of such received signals, the direction of the single signal source may be determined.

In the past there have been a number of approaches to electronic angle measuring equipment employing phase measurment techniques. One prior art type of system summed the received signals developed at two widely spaced antennas to produce a signal the amplitude of which was proportional to the direction of the cosine of the transmitted wave front with respect to the base line as defined by the two spaced antennas. This type of prior art system was inherently rather severely limited in that a change of amplitude was a function of the rate of change of the direction cosine. As a result, the amplitude change was very slow and commensurately difficult to detect for relatively small changes in direction. Additionally, the type of system generally described above provided no method for detecting or compensating for changes in the amplitude of the transmitted signal. As a consequence, such changes of amplitude which originated in the transmitted signal were detected in the system as a change of direction, thus introducing a major source of error.

Another prior art method is known as a double local oscillator system. In this type of system, signals transmitted from a distant single signal source are arranged to be received at widely spaced antennas. At each such antenna, the received signal is mixed with an independant local oscillator, there being a frequency difference between the two local oscillators which is known and controlled. The resultant signals which appear at the output of the mixers are in turn summed, amplified and the amplitude modulation of each is detected. An analysis of the type of output signal developed from the summing process described above shows that it is in the form of a double side band suppressed carrier signal. Accordingly, the output from the amplitude modulation detector is non-sinusoidal. As a result, phase comparison between the double local oscillator off-set frequency and the detected frequency is somewhat less accurate than may be desired. This difficulty largely resides in the fact that the output of the amplitude modulation detector in such a double local oscillation system is substantially in the form of a half-wave rectified signal which contains a large measure of even harmonics of the reference frequency and thus is difficult to detect accurately.

Moreover, certain difficulties of maintaining stable frequencies are inherent in any multiple, locked loop oscillator system of this type. Since its proper operation depends in part upon maintaining an accurately controlled difference frequency between the two local oscillators, that type of system necessarily involves double problem of drifts as well as other types of instability of the two oscillators, not only in an absolute sense but also with respect to each other.

Accordingly, It is a primary object of the present invention to provide an improved angle measuring equipment which obviates major disadvantages of the prior art systems.

Another equally important objective of the present invention is to provide such an angle measuring equipment employing but a single local oscillator.

Another object of the present invention is to provide an angle measuring equipment which develops output signals indicative of the direction of a transmitted signal source, which signals may be readily and accurately detected for the directional information contained therein.

Yet a further object of the present invention is to provide an angle measuring system which includes the capability of determining the direction of the source of the transmitted signal without impairing telemetry, distance measuring information, or other types of intelligence which may be contained within the transmitted signal.

A further object of the present invention is to provide an angle measuring equipment system which is so conceived as to provide a simpler arrangement of equipment through the elimination of the multiplicity of elements such as double local oscillators and associated ancillary equipments.

In its preferred form the present invention contemplates an angle measuring equipment for measuring the direction of a single signal source relative to two orthogonal base lines. Each of the base lines is defined by a reference antenna which is positioned at the intersection of the base lines and at least one signal antenna located at another point along each of the two base lines. The signal which is developed at each of the signal antennas is modulated by a balanced modulator to generate a double sideband suppressed carrier signal from each such received signal. The double sideband suppressed carrier signal is then summed with the signal developed at the reference antenna and appropriately amplified. A fixed frequency signal source, usually in the form of a single local oscillator, provides a signal which is mixed with the double sideband suppressed carrier signal to generate an intermediate frequency signal at a frequency selected and determined for facility of operation and convenience.

By conventional means, two reference signals are developed, one being in phase with, and the other being in quadrature phase relationship relative to the intermediate frequency carrier signal. These reference signals are mixed with the intermediate frequency amplifier output to produce two independent outputs which are phase and amplitude modulated, respectively. The amplitude modulated signal is passed through a quadrature phase shift means to a summing circuit element which may ordinarily take the form of a summing filter. The phase modulated signal provides the second input to the summing means which produces an output of a constant frequency varying in phase as the phase of the signal developed at the signal antenna varies relative to the signal developed at the reference antenna. Accordingly, the summed signals have a phase which is indicative of the direction of the single signal source received by the two antennas, i.e. the reference antenna and the signal antenna displaced along the previously mentioned base line.

In accordance with the concept of the present invention, any desired plurality of signal antennas may be displaced at appropriate points along the base lines, usually in accordance with the same convenient multiple of the wavelength of the signal transmitted from the source. Each signal received at a signal antenna is modulated in a balanced modulator means by a different frequency, to develop separate double sideband suppressed carrier signals which are processed in the manner described above by being summed with the signal received at the reference antenna, appropriately amplified, mixed with a local oscillator signal to develop an intermediate frequency signal, from where it is fed to a synchronous amplitude modulation detector and a synchronous phase modulation detector. Also as previously described, the second inputs to the detectors comprise a fixed frequency oscillator source signal connected directly as a second input to the synchronous phase modulation detector and phase shifted in quadrature to provide the second input to the synchronous amplitude modulation detector. Separate subcombinations are appropriately arranged to operate on each of the separate signals received at the plurality separated and discrete signal antennas. Each such sub-combination comprises appropriate data amplifiers which are arranged and connected too receive the amplitude modulation detector output signal and the phase modulation output detector signal, respectively. The amplitude modulation signal is phase shifted in quadrature to provide one input to a summing means. The amplified phase modulation detected signal providing the second input to the summing means.

The output of the summing means in each of the subcombinations is a respective constant frequency signal substantially that of the center frequency of balanced modulator which is arranged to operate on each separate received signal at the displaced signal antennas, and each such constant frequency has a phase which varies as function of the direction of the single signal source. Thus, the present invention employs but a single local oscillator that is adapted to process all the singals received at a plurality of displaced signal antennas arranged along the base lines orthogonally oriented with respect to a reference antenna positioned at the intersection of the base lines.

In accordance with the concept of the present invention, the only equipment that need be provided in a plurality of arrangements commensurate with the pluarlity of displaced separate signal antennas, is that portion which processes the detected amplitude modulated signal and the detected phase modulated signal from the intermediate frequency signal by phase shifting the amplitude modulated signal in quadrature and summing it with the phase modulated detected signal. Problems common to comparable prior art systems have been effectively eliminated by obviating the need for multiple local oscillators.

These and other features, advantages, and objects of the present invention will be more readily understood from the description of an embodiment of the present invention together with illustrative drawings in the form of a functional block diagram of the embodiment and certain of the signal relationships developed in the course of its operation.

Figure 1:
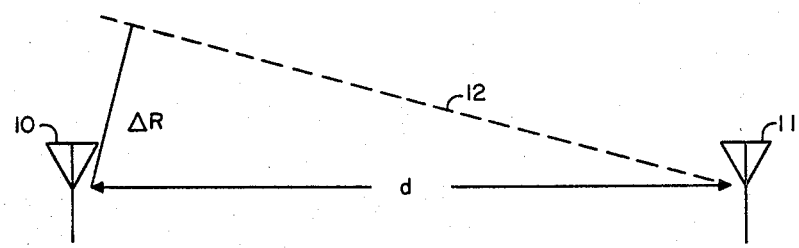
FIGURE 1 is schematic diagram illustrating the wave front of a received signal with respect to displaced antennas.

As was briefly described hereinbefore, antennas displaced along a known or determinable base line are generally employed to produce signals which by reason of their phase relationship are useful to indicate the direction of a signal source. As illustrated in FIGURE 1, displaced antennas 10 and 11 that are separated by a distance will receive signals from a signal source along a wavefront as indicated by the dash lines generally at 12. The wavefront 12 will generate signals at the displaced antennas 10 and 11 having a difference in phase depending on the angle $\Delta R$. If the angle $\Delta R$ is expressed in radians, the direction cosine may be expressed as $$e = \frac{\Delta R}{R}$$

or $$e = \frac{\phi \lambda}{2\pi d}$$

Therefore, $$\phi = \frac{\Delta R (2\pi)}{\lambda}$$

This relationship is the one which is basically employed in the prior art systems and those of the present invention to determine the direction of the source of the signals received at the displaced antennas.

Figure 2:
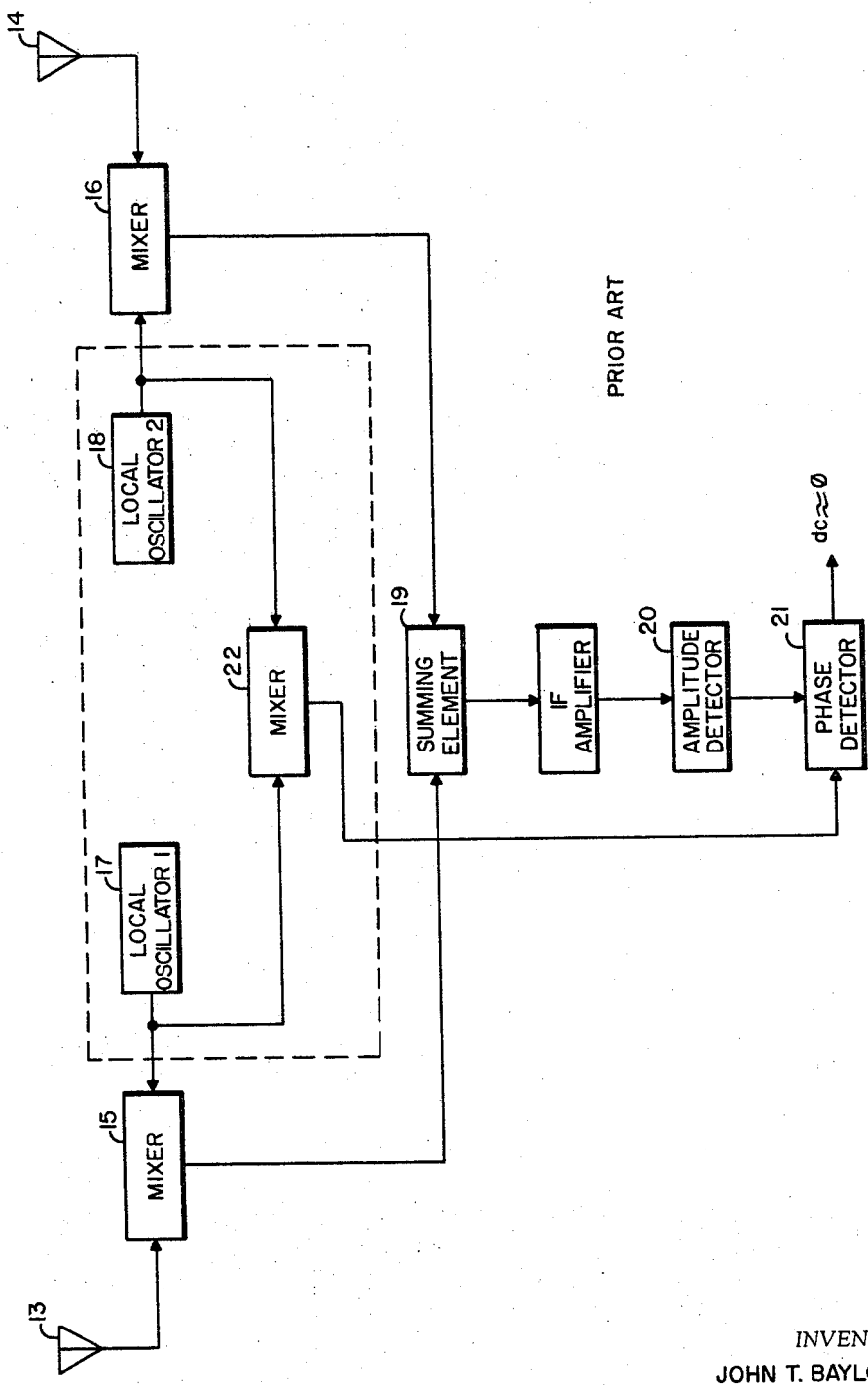
FIGURE 2 is a schematic block diagram of a portion of the prior art double local oscillator type of system.

As shown in FIGURE 2, two such displaced antennas 13 and 14 are arranged to provide one of two inputs to respective mixer means 15 and 16. The first local oscillator 17 provides the second input to the mixer 15 while a second local oscillator 18 provides a second input to the mixer 16. The resultant outputs from mixers 15 and 16 are summed in a summing element 19. The summed signal is then converted to an intermediate frequency which is amplitude detected in an amplitude detector means 20 and phase detected with respect to the difference frequency between the two local oscillators 17 and 18 by means of a phase detector 21. The difference frequency between the local oscillators 17 and 18 is provided by mixing the output of those oscillators in a mixer 22 which develops one of the inputs to the phase detector 21. The previously mentioned signal output of the amplitude modulation detector 20 provides a second input to the phase detector 21.

The intermediate frequency is both phase and amplitude modulated and upon detection in the phase detector 21, develops an output which is in essence a full wave rectified sine wave form. Such wave form contains a relatively large component of second harmonic signal which in turn makes its phase relatively difficult to detect. This difficulty is one of the principal disadvantages of several problems encountered in typical operation of prior art angle measuring equipments of the so-called double local oscillator type.

Figure 3:
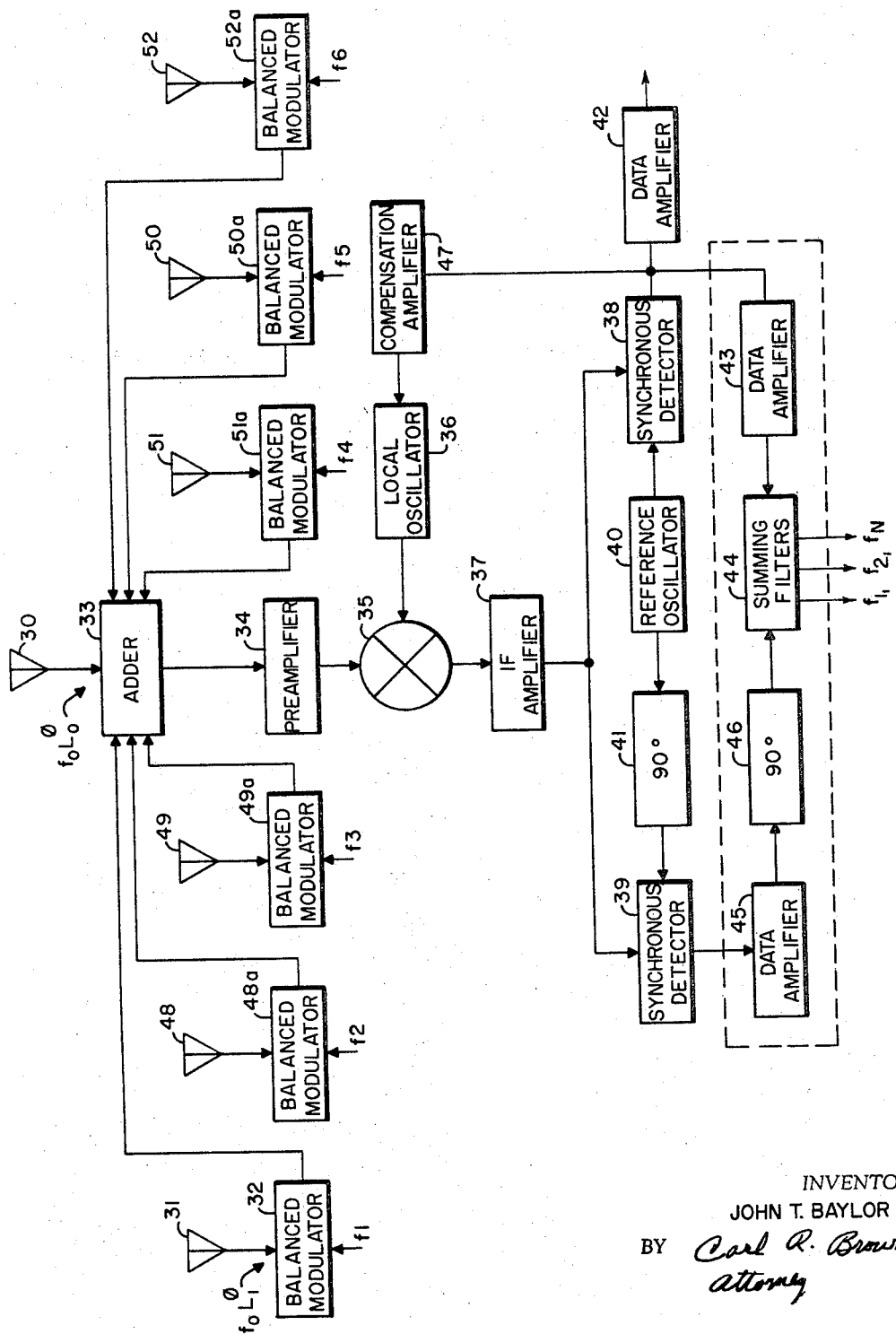
FIGURE 3 is a simplified block diagram of an embodiment of the present improved angle measuring equipment invention.

FIGURE 3 illustrates in schematic block diagram form an embodiment of the present invention. A reference antenna 30 is located at the intersection of two orthogonally oriented base lines along which secondary signal antennas are located. One such signal antenna is schematically illustrated at 31. The signal received at the signal antenna 31 is operated upon by a balanced modulator 32 to develop a double sideband suppressed carrier signal which together with the signal developed by the reference antenna 30 provides the input to a summing means such as that indicated at 33. A preamplifier 34 may be employed to receive the output of the summing means 33 and appropriately amplify that output signal to provide one of two inputs to a mixer circuit 35.

The second input to the mixer 35 is provided by a local oscillator 36 which generates a signal of known fixed frequency. The outputs of the preamplifier 34 and the local oscillator 36 are mixed in the mixer 35 to generate a resultant intermediate frequency signal. An intermediate frequency amplifier 37 appropriately amplifies the output of the mixer 35 and provides inputs to a pair of synchronous detectors 38 and 39. The synchronous detector 38 is a phase modulation detector which receives one of its inputs from the intermediate frequency amplifier 37 and another input from a reference oscillator 40 to produce an output which is a function of the phase modulation contained in the intermediate frequency signal.

The reference oscillator 40 provides an output which is passed through a quadrature phase shift means 41 which may take the form of a passive filter network. The quadrature phase shifted output of the phase shift means 41 provides the second input to the synchronous detector 39 which operates to detect the amplitude modulation contained in the intermediate frequency signal output of the intermediate frequency amplifier 37.

The output of the synchronous phase modulation detector 38 may be connected to provide the input to a data amplifier as shown at 42 which can be employed with telemetry or distance measuring equipment in a manner which will be explained more fully hereinafter.

The same output of the synchronous phase modulation detector 38 is connected to a data amplifier 43 to produce an amplified input to a summing means 44 which may take the form of an appropriate filter. The output of the synchronous amplitude modulation detector 39 is received by a data amplifier 45, the output of which is quadrature phase shifted in a phase shift means as indicated at 46. The quadrature phase shifted output of the phase shift means 46 produces the second input to the summing circuit 44. The two inputs to the summing means 44 generate an output signal of constant frequency but having a phase which varies as a function of the phase of the signal developed at the signal antenna with respect to the phase of signal developed at the reference antenna and thus is indicative of the angle and direction of the source of signals and more particularly of the angle of the wavefront of such signals as that wavefront reaches the respective reference and signal antennas providing the two inputs to the system. As is known by those skilled in this art, the phase information from the several antenna units, such as antenna unit 31 and 32, relative to the signal at the reference antenna 30, may be detected or compared by known systems with the particular frequency input to each of the antenna units, such as frequency $f_1$, to develop the angle and direction of the source of the signals. Examples of such known systems are illustrated in the U.S. Patent No. 2,976,530 and U.S. Patent No. 3,078,460.

The output of the synchronous phase modulation detector 38 may also provide an input to a compensation amplifier 47 which generates an output signal, preferably in the form of a D.C. voltage, to control and maintain the single local oscillator 36 at a desired and predetermined frequency.

Figure 4:
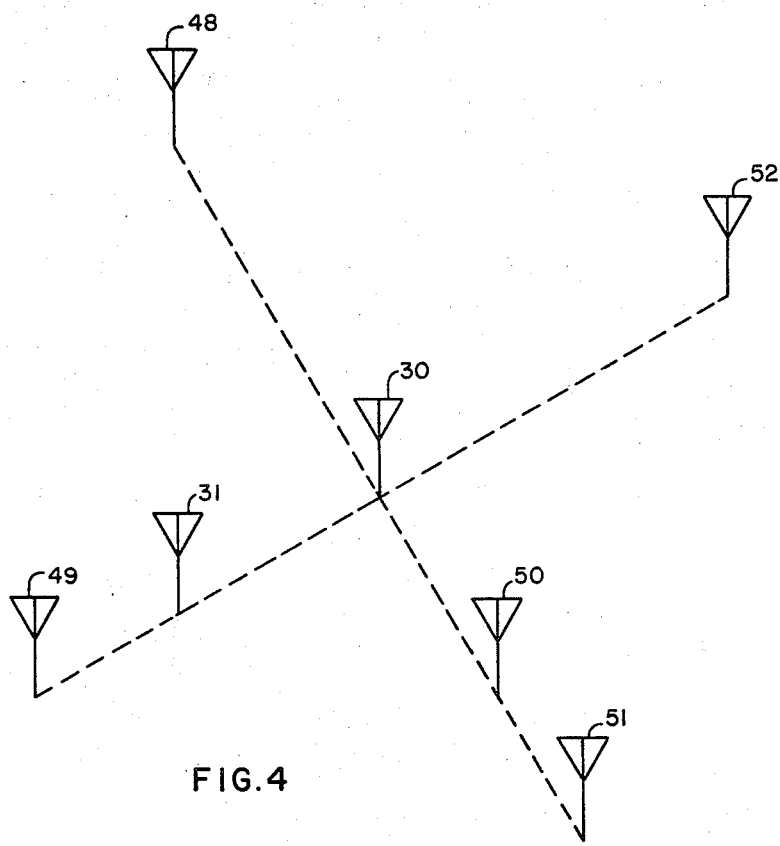
FIGURE 4 is a diagram of a typical multiple antenna arrangement which may be employed in conjunction with the present invention to accurately measure the direction of a signal source relative to such antenna array.

Referring now to FIGURE 4, there is seen a schematic illustration of a type of spacial disposition of a reference antenna 30 and a plurality of signal antennas disposed along orthogonal base lines. The signal antennas include the antenna 31 referred to in the foregoing explanation of the basic mode of operation of the embodiment of the present invention as illustrated in FIGURE 3 and also includes additional signal antennas 48, 49, 50, 51 and 52. These are customarily disposed at convenient distances from the referenced antenna 30, usually in multiples of wave lengths which facilitate the computation of angular disposition of the source of signals impinging upon the antenna array. In FIGURE 3 the additional signal antennas 48, 49, 50, 51 and 52 are shown in the manner that they are connected into the angle measuring equipment system of the present invention and bear the same numerical designation as in FIGURE 4. As shown in FIGURE 3 each signal antenna 48, 49, 50, 51 and 52 has an associated balance modulator such as those illustrated at 48a, 49a, 50a, 51a and 52a. Each of these balanced modulators operates substantially in the manner described previously in connection with basic operational features in accepting the signals generated through the balanced modulator 32. However, each of the balanced modulators 32, 48a, 49a, 50a, 51a and 52a operates to modulate about a different center frequency and all the outputs of the balanced modulators 48a, 49a, 50a, 51a and 52a, in addition to the output of the balance modulator 32, are added to the output of the reference antenna 30 in the summing means 33 and pass on through the angle measuring equipment system in the manner previously described. The ultimate outputs of the system are comparable in character to the output from the summing means 44 previously described, in that each output is at a constant frequency which is the same respective frequency as the center frequency of the associated balanced modulator where the signal was originally received. Each of the plurality of frequencies is in itself constant, and will vary in phase relative to the center frequency of the associated balanced modulator and the phase of the signal originally received at each signal antenna varies relative to the phase of the signal developed at the reference antenna.

It should be noted that the plurality of double sideband suppressed carrier signals which are generated by the plurality of balanced modulators (each at a different center frequency) are commonly processed through the system including the summing means 33, the preamplifier 34, and are mixed in the mixer 35 with the output of the local oscillator 36 and appropriately amplified in the intermediate frequency amplifier 37. The plurality of double sideband suppressed carrier signals are commonly impressed upon the two synchronous detectors, one of which, as indicated at 39, is a synchronous amplitude modulation detector and the other of which, as indicated at 38, is a synchronous phase modulation detector. A quadrature phase shift is introduced between the two signal outputs of the reference oscillator 40 connected to the two synchronous detectors 38 and 39. The quadrature phase shift may be accomplished by any one of many known techniques such as a passive filter network 41 operating upon the output of the reference oscillator 40 of known and fixed frequency. The frequency of the reference oscillator 40 may be comparatively low, i.e., typically of the order of a few megacycles. Up to this point in the system all the signals developed by the multiple array of signal antennas are commonly processed and operated upon with the single exception that each signal is originally modulated about a predetermined different center frequency.

The use of the compensation amplifier 47, operating on the output of the synchronous phase modulation detector 38 and providing a control signal, usually in the form of a D.C. voltage, to maintain the frequency of the local oscillator 36 constant, insures that the frequency of the signals being produced out of mixer 35 is exactly in quadrature with the reference oscillator signal. Since the carrier frequency at each intermediate frequency output is thus maintained in quadrature with the output of the reference oscillator 40, the signal at the data frequency, which is the output of the synchronous phase modulation detector, is the phase modulation component of the synthetic modulating signals produced at the added or summing means 33. In much the same manner, the signal at the data frequency which is produced as the output of the synchronous amplitude modulation detector 39 is the amplitude modulation component of the modulated signal produced at the summing means 33. These signals at the data frequencies are amplified in the data amplifiers 43 and 45 and it is important to note at this point that the envelope of the data signals produced as the outputs of data amplifiers 43 and 45 are in quadrature with respect to each other but the signals themselves are not in quadrature.

The amplitude of the signals at the data frequencies, at the output of the synchronous phase modulation detector is a function of the cosine of the phase of the radio frequency signal developed at the signal antennas with respect to the phase of the signal developed at the reference antenna. The amplitude of the signals developed at the synchronous amplitude modulations detector 39 and data amplifier 45 is a function of the sine of the phase of the radio frequency signals developed at the respective signal antennas with respect to that signal developed at the reference antenna.

The output of the data amplifier 45 is phase shifted in a quadrature phase shift circuit, which may take the form of a simple passive network, with the result that the two inputs to the summing means 44 are in quadrature with respect to each other, both as to the carrier or data frequency and also with respect to their signal envelopes. Thus, when these signals are summed in the summing means 44, the resultant output signal is of one of constant amplitude but at a frequency, the phase of which with respect to the phase of the original data frequency (or center frequency of the signal supplied by the balanced modulator) is a function of the phase of the incoming radio frequency signal developed at the related or associated signal antenna with respect to the phase of the radio frequency signal developed at the reference antenna.

It is most important to note an advantage of the present invention which resides in the fact that the addition of extra signal antennas in no way changes the operation of the system. Each signal antenna has its own balanced modulator and its own predetermined assigned modulating frequency which contains a center frequency previously referred to as the data frequency. Thus, all the signals received can be handled by the single combination of elements as illustrated in FIGURE 3 from the plurality of input antennas through the outputs of the synchronous detectors in the form of the synchronous amplitude modulation detector and the synchronous phase modulation detector as indicated as 39 and 38, respectively.

Practical considerations may make it necessary to have independent data amplifiers for each of the plurality of modulating frequencies which are associated with respective pluralities of signal antennas. Additionaly, appropriate phase shifting means and summing means may be required for each signal antenna. Thus, those elements illustrated in FIGURE 3 comprise data amplifiers 43 and 45, the quadrature phase shift means 46, and the summing means 44 may for practical considerations be repeated in a plurality of like combinations, each of which is associated with and designed to accommodate a different one of the plurality of input signals developed by different signal antennas as previously described in connection with FIGURE 4.

Another significant advantage of the present invention, as contrasted with the known prior art double local oscillator type of system, in the concept of the present invention is such that telemetry, distance measuring equipment information or other forms of intelligence received in the input signals from the signal source may be conveniently recovered from the output developed by the synchronous phase modulation detector 38 as appropriately amplified in the data amplifier 42.

The prior art system, such as the double local oscillator system, does not have this advantage in that the incoming signals developed in a double local oscillator system, when operated upon by the two local oscillators, produce resultant outputs in which telemetry, distance measuring or comparable intelligence may be severely impaired or completely lost.

Additionally, a most significant aspect of the present invention is that it produces waveforms which are readily processed to detect phase modulation information. This is so because the waveforms developed in the present invention do not contain interfering and undesirable components such as the second harmonic component which was a disadvantage of the waveforms produced by the prior art double oscillator type of system.

Those skilled in the art will appreciate that the concept of the present invention has provided a highly accurate means of measuring the angle of an incoming radio frequency signal to determine the direction from whence such signal emanate. Moreover, the concept of the present invention may be embodied in a considerably simpler configuration of circuitry than was usually involved in most prior art systems and the output signals developed by the embodiments of the present invention may be processed for recovery of other intelligence contained in the original signal such as telemetry information or signals useful in distance measuring equipment.

It will also be obvious to those skilled in the art that the employment of double local oscillators rather than a single local oscillator inherently involves problems of drift and instability which are obviated by the uniquely advantageous concept of the present invention.

I claim:
1. An angle measuring equipment for measuring the direction of a signal source relative to two orthogonal base lines comprising:
   a reference antenna positioned at the intersection of said base lines;
   at least one signal antenna located along a base line;
   a balanced modulator connected to receive the signal developed by each of said signal antennas for generating a double sideband suppressed carrier signal therefrom;
   a summing means connected to receive said double sideband suppressed carrier signals and the signals developed by said reference antenna;
   a local signal source providing an output signal having a substantially constant difference of frequency relative to the output of said summing circuit;
   mixer means connected to receive the outputs of said local signal source and said summing circuit for producing resultant intermediate frequency signals;
   a reference source of fixed frequency signals;
   first quadrature phase shift means for developing first quadrature phase signals from an output of said reference source;
   phase synchronous detector means for receiving said intermediate frequency signals and said fixed frequency signals and providing first output signals;
   amplitude synchronous detector means for receiving said intermediate frequency signals and said quadrature phase signals and providing second output signals;
   second quadrature phase shift means for developing second quadrature phase signals from said second output signals;
   and summing means for summing said first output signals and said second quadrature phase signals.
2. An angle measuring equipment as claimed in claim 1 and including at least one signal antenna located along each of said base lines;
   balanced modulator means connected to modulate the signal developed at each said signal antenna about a different center frequency;
   said second quadrature phase shift means being correlated to each of said signal antennas and connected to operate upon said second output signals of said synchronous amplitude detector means;
   and said summing means being correlated to each of said signal antennas for summing each of said second quadrature phase shifted signals and said first output signals of said phase synchronous detector means.
3. An angle measuring equipment as defined in claim 1 and including a plurality of signal antennas located at different positions along said base lines;
   said second quadrature phase shift means comprising a plurality of means arranged to receive said second output of said synchronous amplitude detector means, each said means producing a second quadrature phase shifted output correlated to the signals developed by one of said plurality of reference antennas;

and said summing means being connected to receive each said second quadrature phase shifted outputs and the first output of said phase synchronous detector means for summing said signals, whereby to produce an output of constant frequency varying in phase as a function of the variation of phase of the signals developed by each of said signal antennas relative to the phase of the signals developed by said reference antenna.

4. An angle measuring equipment as claimed in claim 1 in which,
said intermediate frequency signals being in quadrature with the fixed frequency signals of said reference source.

5. An angle measuring equipment as claimed in claim 4 and including means responsive to said first output signals of said phase synchronous detector means for developing an output signal as a function of the frequency of said first output signals, said output signal being connected to said local signal source for correcting frequency and phase deviations of said output of said local signal source to maintain said intermediate signals in quadrature with said fixed frequency signals.

6. An angle measuring equipment as claimed in claim 1 wherein the intermediate frequency bandwidth can accommodate intelligence signals of frequencies other than those of said angle measuring signals.

7. An angle measuring equipment as claimed in claim 1 and including data output means responsive to said first output signals of said phase synchronous detector means for providing telemetry and distance measuring signals received from said signal source.

References Cited

UNITED STATES PATENTS 3,060,425    10/1959    Cutler.
3,307,193    2/1967    Kaufman _____ 343—113 X RODNEY D. BENNETT, *Primary Examiner.*